March 13, 1956  D. W. BURBECK ET AL  2,738,461
METHOD AND APPARATUS FOR MEASURING TIME INTERVALS
Filed March 15, 1951  3 Sheets-Sheet 1
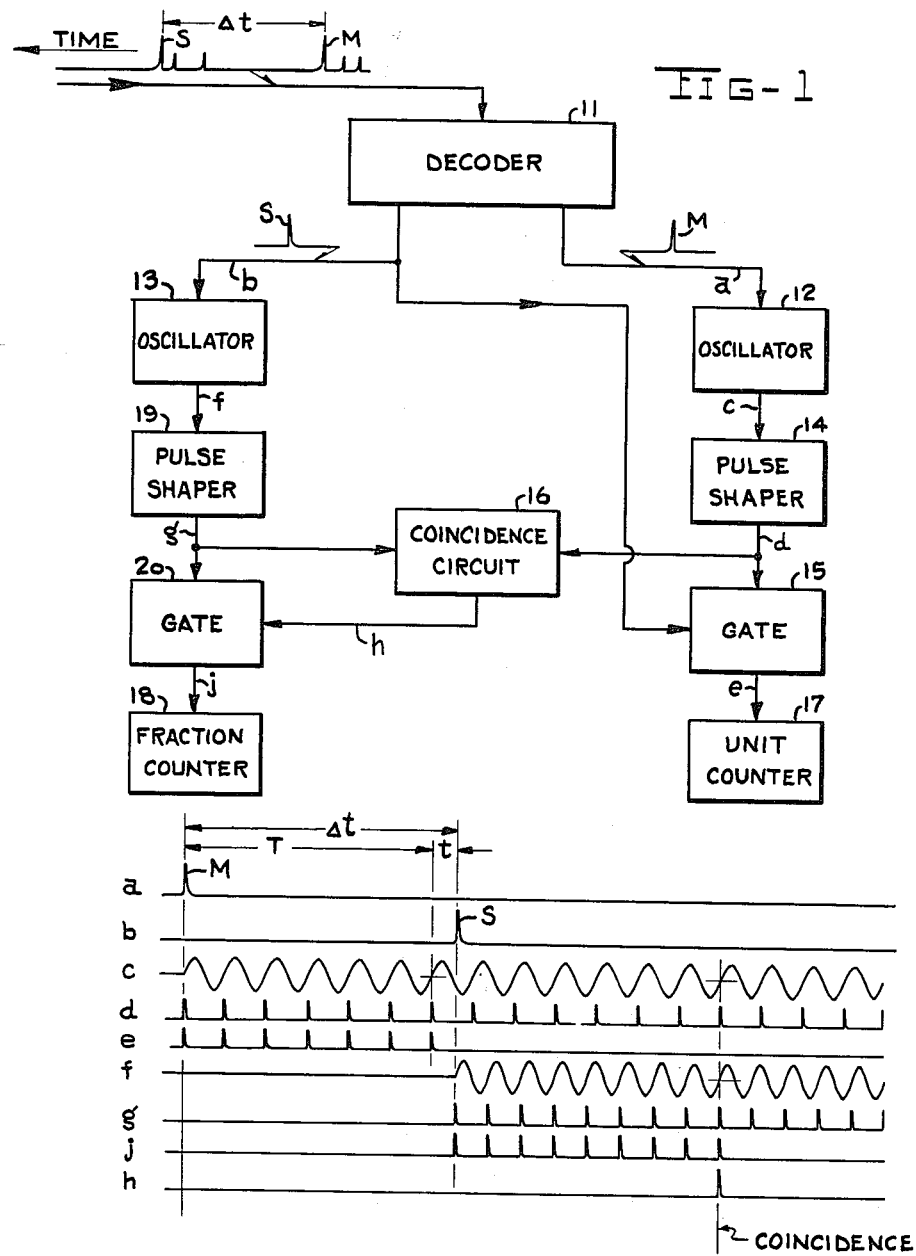
INVENTORS.
DONALD W. BURBECK.
HERBERT B. BROOKS.

March 13, 1956     D. W. BURBECK ET AL     2,738,461
METHOD AND APPARATUS FOR MEASURING TIME INTERVALS
Filed March 15, 1951     3 Sheets-Sheet 2
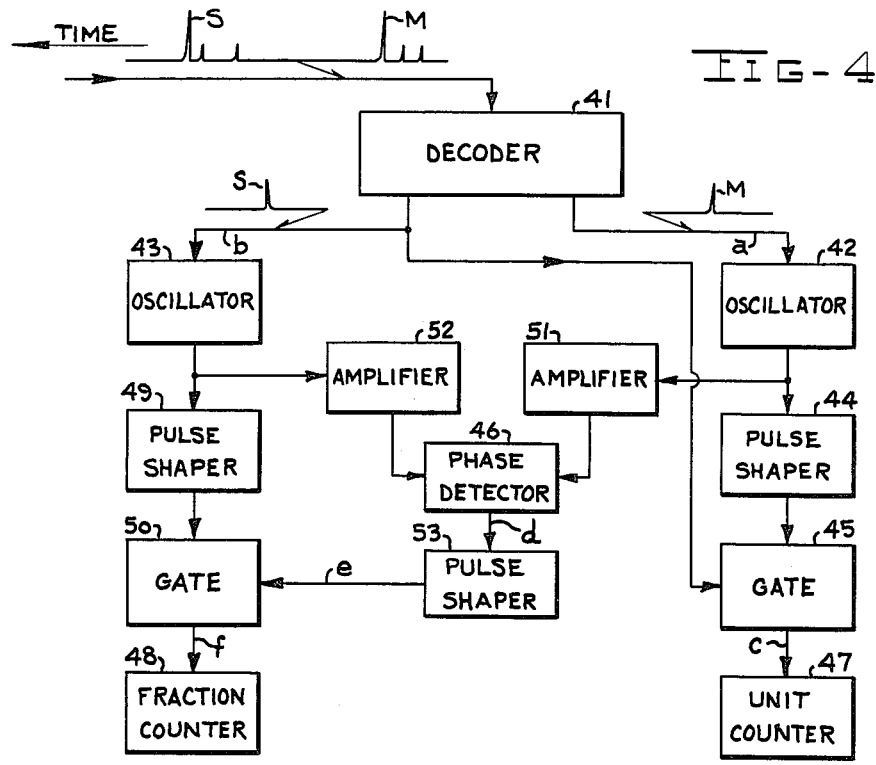
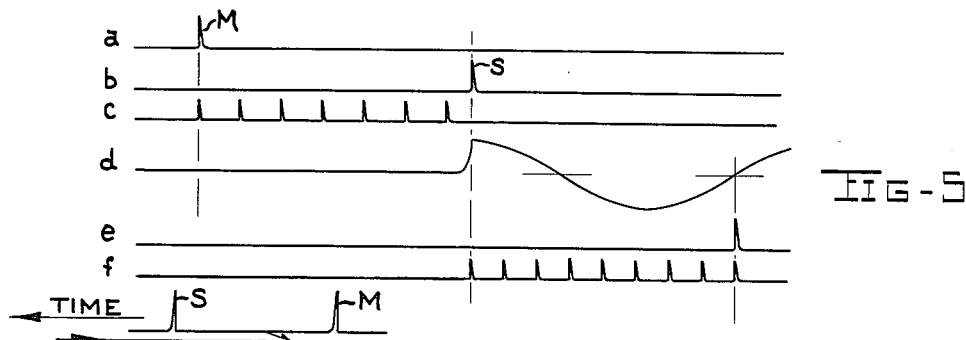
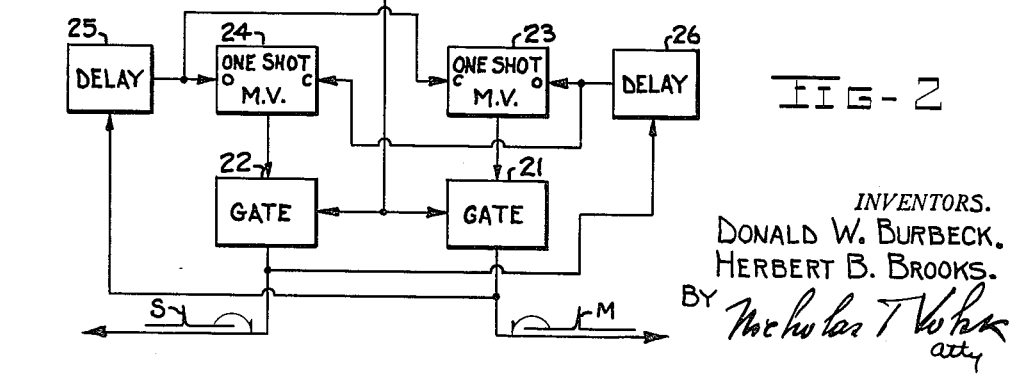
INVENTORS.
DONALD W. BURBECK.
HERBERT B. BROOKS.

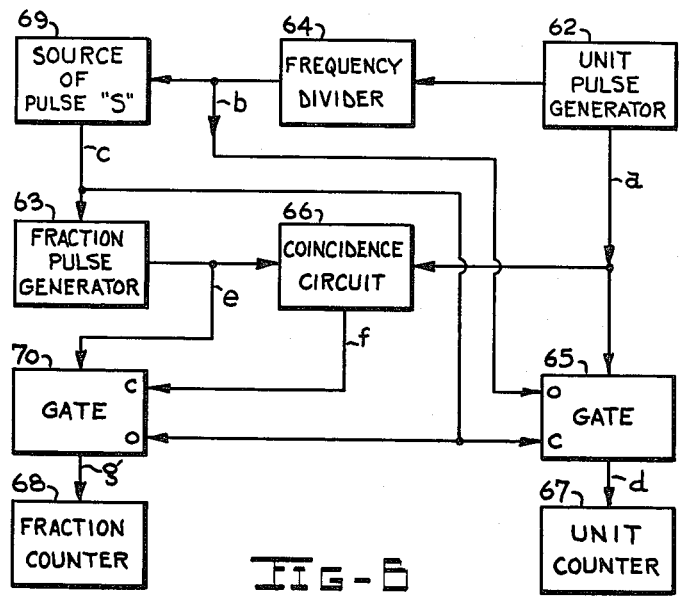
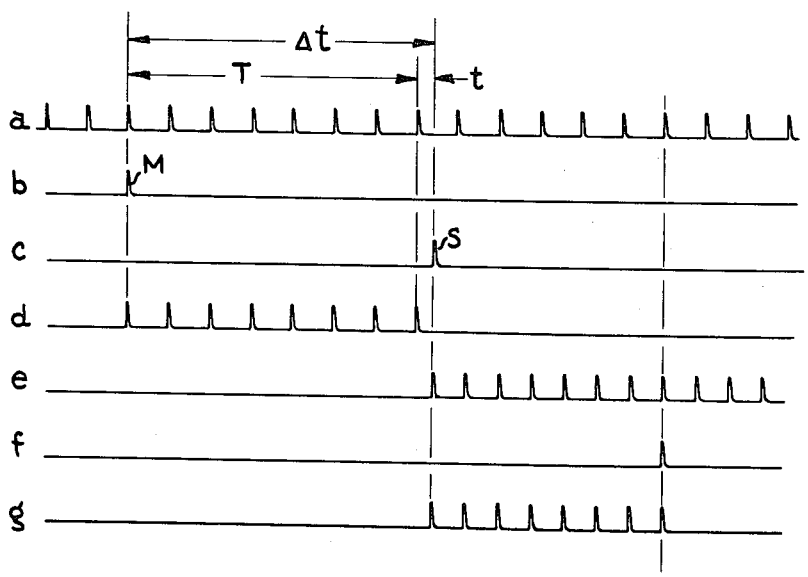
INVENTORS.
DONALD W. BURBECK.
HERBERT B. BROOKS.
BY Nicholas T Volar
atty

United States Patent Office 2,738,461
Patented Mar. 13, 1956

2,738,461
METHOD AND APPARATUS FOR MEASURING TIME INTERVALS

Donald W. Burbeck, Los Angeles, Calif., and Herbert B. Brooks, Prescott, Ariz., assignors, by mesne assignments, to Hughes Aircraft Company, a corporation of Delaware Application March 15, 1951, Serial No. 215,692

12 Claims. (Cl. 324—68)

The present invention relates to a method and apparatus for measuring time intervals, and more particularly to a method and apparatus for automatically measuring the time interval between a pair of spaced signals.

Systems for measuring time intervals, such as the time interval between two pulses, may be classified into two general categories; namely, analog systems wherein the interval is represented as a physically measurable variable quantity, such as voltage, and digital systems wherein the interval is expressed in terms of digits which can assume only discrete values. In either system, the final result may be indicated in either digital form or analog form. In general, analog systems require continuous repetition of the pair of signals before a final reading can be obtained. Furthermore, analog systems require at least partial manual operation, particularly in visual comparison of the magnitude or position of the signals. Even in those instances where automatic operation is attained, the arrangement requires motors and highly accurate servo mechanisms, and very numerous and very accurate repetition of the signals. In all analog systems, the power supplies must be highly regulated, and extremely precise components must be used if high accuracy is to be obtained.

Although digital time measuring systems are known in the prior art, their use has been limited, due to the low accuracy of such systems. In prior art digital systems, the practice has been to count the number of uniformly spaced pulses occurring during the time interval to be measured. Thus, the accuracy of these systems is limited to the spacing between the pulses and the maximum speed at which the counters are operative. The spacing is limited by the accuracy of gating circuits and their ability to discriminate between successive pulses. Thus, prior art digital time measuring systems have little utility in applications requiring high accuracy and resolution, such as in the field of nucleonics where the time interval to be measured is of the order of a few microseconds.

The present invention discloses a method and apparatus for measuring time intervals which obviates the disadvantages of analog measuring systems, and which extends the accuracy of digital systems far beyond that attainable in the prior art. This greater accuracy is attained without increasing the rate at which counting is performed. Furthermore, in the system of the present invention, the main requirement is to maintain frequencies constant, and frequency maintenance is well known to the art. The basic principle of the present invention resides in measuring the number of pulses delivered by a master oscillator during the interval of time to be measured and in measuring the number of pulses delivered by an auxiliary oscillator having a different frequency from that of the master oscillator whenever the interval of time to be measured is not exactly equal to a multiple of the period of the master oscillator. The frequencies of the auxiliary and master oscillators are related in accordance with the relation $$\frac{n}{n-1}$$

where $n$ is an integer. By controlling the actuation of the auxiliary oscillator, the count obtained therefrom may be utilized in a manner identical with conventional mechanical vernier measurements.

It is an object of the present invention to provide a method and apparatus for automatically measuring the time interval between a pair of spaced signals.

Another object is to provide a method and apparatus for measuring the time interval between a pair of spaced signals in terms of the number of unit periods and the number of fractional periods, whenever the time interval to be measured is not exactly equal to a multiple of the unit period.

A further object is to provide a method and apparatus employing vernier interpolation for measuring time intervals.

Still another object is to provide a method and apparatus for electronically interpolating the measurement of the time interval between a pair of spaced signals.

A still further object is to provide a method and apparatus for measuring time intervals by measuring the number of pulses delivered by a master oscillator during the time interval and by measuring the number of pulses delivered by an auxiliary oscillator, whenever the interval of time to be measured is not exactly equal to the multiple of the period of the master oscillator.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Fig. 1 is a block diagram of one embodiment of the present invention;

Fig. 2 is a block diagram of one form of the decoder of Fig. 1;

Fig. 3 is a diagram of waveforms occurring at various points in the circuit of Fig. 1;

Fig. 4 is a block diagram of a modification of the circuit of Fig. 1, in which phase detection is employed;

Fig. 5 is a diagram of waveforms occurring at various points in the circuit of Fig. 4;

Fig. 6 is a block diagram of another embodiment of the invention; and

Fig. 7 is a diagram of waveforms occurring at various points in the circuit of Fig. 6.

Referring now to the drawings, there is shown in Fig. 1 a vernier interpolation system embodying the basic principle of the present invention wherein an auxiliary or vernier oscillator is utilized for measuring the time interval $\Delta t$ which exists between a pair of pulses M and S. As shown in Fig. 1, a decoder 11 has its input end connected to the source, not shown, of pulses M and S, and its output ends connected to a master oscillator 12 and a vernier oscillator 13, respectively. Decoder 11 may be any convenient device for directing pulse M to oscillator 12 and pulse S to oscillator 13.

Where each of pulses M and S is preceded by one or more coding pulses, as shown in Fig. 1, one form of decoder would be a pair of double-pulse selectors employing different delay lines and grid-cathode addition in a triode. One such selector is illustrated in Fig. 10-2 on page 367 of vol. 19 of the Massachusetts Institute of Technology Radiation Laboratory Series, published in 1949 by McGraw-Hill Book Company, Inc., which is hereby made a part of this disclosure. In this form of decoder, each selector delays an early member of the incoming train of pulses and thereby permits time selection of a later member of the train by the delayed member. By employing different delay lines for each selector, pulses M and S may be applied to their respective oscillators.

Fig. 2 illustrates one convenient form of decoder 11 to be employed where no decoding pulses are utilized and the input signal consists of the spaced pulses M and S. As shown in Fig. 2, the input signal is fed to a pair of gates 21 and 22 controlled by a pair of one-shot multivibrators 23 and 24, respectively. The output end of gate 21 is connected to a delay line 25 which is connected to one input terminal of each of multivibrators 23 and 24. The output gate 22 is connected to a delay line 26 which is connected to the other input terminal of multivibrators 23 and 24.

In operation gate 21 is normally open and gate 22 is normally closed so that incoming pulse M appears at the output of gate 21. Pulse M is also fed to the input end of delay line 25 and, after a convenient time delay, is fed to multivibrator 24 to actuate the same and thereby open gate 22. Pulse M is applied simultaneously to multivibrator 23 to actuate the same and thereby close gate 21. Upon application of pulse S, this pulse appears at the output of gate 22. Pulse S is also fed to the input end of delay line 26, and after a convenient time delay, is fed to multivibrator 23 to actuate the same and thereby open gate 21, and to multivibrator 24 to actuate the same and thereby close gate 22. The circuit is then ready for the next incoming pulse M. Delay lines 25 and 26 are provided to introduce a sufficient time delay to permit the incoming pulse to pass through the circuit before actuation of the multivibrators. The periods of multivibrators 23 and 24 must be sufficiently long to maintain gate 21 closed and gate 22 closed for the maximum time interval between pulses M and S.

It is to be understood, of course, that the particular arrangements of decoder 11 outlined above are merely illustrative and form no part of the present invention. Any convenient form of decoder, depending upon the type of incoming pulses, is contemplated and may be used without departing from the spirit and scope of the invention.

Each of oscillators 12 and 13 is so arranged that it starts oscillating at the instant its respective pulse is impressed thereon. The phase of its oscillation is precisely related to the time of arrival of the pulse which starts its oscillation so that no time error due to delayed response is introduced by the oscillators as they start. The frequencies of oscillators 12 and 13 are related in accordance with the ratio $$\frac{n}{n-1}$$

where $n$ is an integer. It is clear that vernier operation by oscillator 13 may be attained where the frequency of oscillator 13 is either greater or less than that of oscillator 12. However, in the embodiment illustrated in Fig. 1, the greater frequency is chosen.

The output end of oscillator 12 is connected to the input end of a pulse shaper 14 for transforming the sinusoidal output signal of oscillator 12 into a series of unidirectional sharp pulses. Pulse shaper 14 has its output end coupled to the input end of a normally open gate 15 and to one input terminal of a coincidence circuit 16. Gate 15 has its output end coupled to the input terminal of a counter 17 which counts the number of pulses applied thereto.

The output end of oscillator 13 is coupled to the input end of a counter 18 through a pulse shaper 19 and a normally open gate 20. As shown in Fig. 1, pulse S, after passing through decoder 11, is applied to the control terminal of gate 15 in order to close gate 15 at the instant pulse S appears at gate 15. The output end of pulse shaper 19 is connected to another input terminal of coincidence circuit 16 whose output terminal is connected to the control terminal of gate 20 in order to close gate 20 whenever a signal appears in the output of coincidence circuit 16.

Referring now to Fig. 3, wherein is shown a time diagram of waveforms of the signals appearing at various points in the circuit of Fig. 1, the time interval to be measured is the interval between pulses M and S and is indicated as $\Delta t$. As shown in Fig. 3, the appearance of pulse M at point $a$ in the circuit of Fig. 1 starts oscillator 12 and produces a sinusoidal output signal at point C, the input to pulse shaper 14. This sinusoidal signal is impressed on pulse shaper 14 which transforms the signal into a series of unilateral pulses, indicated in Fig. 3d, which are impressed on gate 15 and one input terminal of coincidence circuit 16.

Since gate 15 is normally open, the unilateral pulses will be transmitted to counter 17 which counts the number of pulses appearing at the input thereof. Gate 15 will remain open until pulse S appears at the output of decoder 11, as shown in waveform $b$ of Fig. 3. Pulse S is then impressed on the control terminal of gate 15 to close gate 15. Accordingly, the input at point $e$ to counter 17 is a series of unilateral pulses representative of the integer count between pulses M and S. This count is recorded in counter 17 which may be termed the integer or unit counter.

As shown in Fig. 3, the total time interval $\Delta t$ to be measured is equal to the integer time interval T plus the fractional time interval $t$ between the occurrence of the last pulse counted by counter 17 and the occurrence of pulse S. It is the function of vernier oscillator 13 and its associated circuits to produce in counter 18 a count indicative of this fractional time interval, whenever pulse S does not coincide with the last pulse impressed on counter 17.

The appearance of pulse S at point $b$ in the circuit of Fig. 1 starts oscillator 13 to produce a sinusoidal output signal at point f, the input to pulse shaper 19. The unilateral pulses appearing at point $g$ are then impressed on gate 20 and the other input terminal of coincidence circuit 16. Gate 20, which is normally open, transmits the pulses to fraction counter 18.

In order to produce vernier operation of counter 18, it is necessary to close gate 20 when the pulses appearing at point $d$ coincide exactly in time with the pulses appearing at point $g$. In other words, as in conventional vernier systems, if the divisions or time intervals between the pulses at point $g$ are related to the divisions or time intervals between the pulses appearing at point $d$ according to the ratio $$\frac{n-1}{n}$$

a count of the number of pulses occuring between the appearance of pulse S and the coincidence of the pulses at points $d$ and $g$ is indicative of the time interval $t$.

It is therefore necessary that coincidence circuit 16 produce an output signal at point $h$ which closes gate 20 at the instant of coincidence. In this manner, the pulses appearing at point $j$ are representative of the fractional count recorded in counter 18. Any suitable circuit for producing an output signal when the two input signals coincide in time may be used as coincidence circuit 16. One convenient circuit is that shown in Figs. 10-18 on page 381 of the above-cited volume, wherein the input signals are applied to the screen grid and the suppressor grid of a pentode.

From the above, it follows that counter 17 will count the integer number of time intervals T, while counter 18 will count the fractional number of time intervals $t$ of the total time interval Δt, as shown in Fig. 3, Δt being the sum of interval T and interval t. In other words, the total count Δt, in terms of units equals the unit count plus the fractional count over n. This summation may be accomplished in any desired manner, either visually or electronically.

Referring now to Fig. 4, there is shown a modification of the circuit of Fig. 1 wherein coincidence is detected by comparison of the phases of the outputs of the oscillators. In Fig. 4, oscillators 42 and 43, pulse shapers 44 and 49, gates 45 and 50, counters 47 and 48, and decoder 41 are identical with and perform the same functions as their counterparts in the circuit of Fig. 1. The outputs of oscillators 42 and 43 are impressed on amplifiers 51 and 52, respectively, amplifiers 51 and 52 having their output ends connected to the pair of input terminals, respectively, of phase detector 46. A pulse shaper 53 is connected between the output end of phase detector 46 and the control terminal of gate 50.

In operation, as shown in Fig. 5, the appearance of pulse M at point $a$ starts oscillator 42 which produces a series of pulses at point $c$, the series being stopped by the appearance of pulse S at point $b$. The appearance of pulse S at point $b$ starts oscillator 43 which produces a series of pulses at point $f$, the series being stopped by the appearance of a pulse at point $e$. Phase detector 46 is any convenient circuit for producing a sinusoidal output signal at point $d$ whose frequency is the difference frequency between oscillators 42 and 43 and whose instantaneous amplitude represents the phase angle between the outputs of amplifiers 51 and 52. When this output signal, indicated as waveform $d$ in Fig. 5, passes through zero in the positive direction, it represents the coincidence condition. At this instant, pulse shaper 53 produces a single pulse which closes gate tube 50.

One suitable circuit for detector 46 is that illustrated in Fig. 2 on page 29 of the Western Union Technical Review, vol. 1, July 1947, in an article entitled "Frequency translators" by F. B. Bramhill. The output of this circuit would then be supplied to a detection circuit, of the type illustrated in Fig. 9–22 on page 345 of vol. 19 of the above-cited text, for producing an output signal when the output of the detector passes through zero.

The total time interval to be measured, that is the total time interval between pulses M and S, is equal to the sum of the counts of counters 47 and 49. As in the circuit of Fig. 1, oscillators 42 and 43 have frequencies related according to the ratio $$\frac{n}{n-1}$$

Thus, if the oscillator actuating the unit counter has a frequency of one megacycle per second, the oscillator actuating the fraction counter has a frequency of $100/99$ megacycles per second. In this manner, the accuracy of the measurement is to the nearest 0.01 microsecond.

It is clear that the circuits of Figs. 1 and 4 will operate satisfactorily, if the oscillator actuating the fraction counter has a lower frequency than that of the unit counter oscillator. Thus, in the example cited above, the frequency of the fraction counter oscillator could be $100/101$ megacycles per second. In this instance, however, the actual fractional count would be 100 minus the count recorded by the fraction counter. In other words, the total count could be obtained by adding one to the unit count and then subtracting the fraction count.

However, referring to Figs. 3 and 5, it can be seen that the count actually recorded in the unit counter is one more than the number of unit time intervals between pulses M and S. Accordingly, if the vernier oscillator has a frequency of oscillation lower than that of the unit pulse oscillator, the total count is obtained by subtracting the fraction count from the unit count, since the additional unit count is already included in the recorded unit count.

Although the embodiments of the present invention have been described in connection with incoming pulses and pulse generators, it is clear that the invention may be applied to a system wherein the first pulse M is derived directly from the unit pulse generator. Referring now to Fig. 6, the unit pulse measuring section comprises a continuously running unit pulse generator 62 having its output end connected to a unit counter 67 through a gate 65. The fraction pulse measuring section comprises a fraction pulse generator 63 coupled to a fraction counter 68 through a gate 70. As in the previous embodiments of the present invention, the outputs of generators 62 and 63 are applied to the input terminals of a coincidence circuit 66, the output terminal of coincidence circuit 66 being connected to the closing control terminal of gate 70. The elements of the circuit of Fig. 6 thus far described are identical with their counterparts in the circuits of Figs. 1 and 4, except that generator 62 is continuously running, and each of gates 65 and 70 is opened by a pulse applied to the opening control terminal thereof.

The output of generator 62 is also applied to the input terminal of a frequency divider 64 which is constructed to divide the applied pulses by a number corresponding to the maximum time interval to be measured. Stated differently, if the maximum time interval to be measured is equal to $p$ times the time interval between the unit pulses from generator 62, where $p$ is an integer, and the time intervals between the pulses of generators 62 and 63 are related according to the relationship $$\frac{n-1}{n}$$

where $n$ is another integer, then divider 64 should be constructed to divide the applied pulses by at least $p+n$. Each of the pulses appearing in the output of divider 64 corresponds to the initial pulse of the pair of pulses to be measured, and is designated M in Fig. 7. This pulse M is applied to the opening control terminal of gate 65 to open gate 65.

Pulse M is also applied to a source 69 of pulse S, the output end of which is connected to the input end of generator 63. Source 69 may be any arrangement for introducing a variable delay between the appearance of pulse M at its input end and the appearance of a pulse at its output end. For example, source 69 may be a radiant energy detection system wherein the appearance of pulse M at its input corresponds to the transmission of a pulse to a target, and the appearance of a pulse at the output of source 69 corresponds to the reception of an echo pulse from the target. Thus, it can be seen that the pulses appearing at the output end of delay system 69 correspond to the final pulse of a pair of pulses to be measured, and are designated S in Fig. 7. It is the time interval between pulse M and pulse S designated Δt in Fig. 7 which is to be measured by the circuit of Fig. 6.

The output end of source 69 is connected to the closing control terminal of gate 65 to close gate 65, and to the opening control terminal of gate 70 to open gate 70.

In operation, referring to Fig. 7, generator 62 is continuously running and produces a series of uniformly spaced pulses at point $a$, the output thereof. This series of pulses is applied to gate 65, but, since gate 65 is initially closed, no pulses appear at point $d$, the input end of unit counter 67. Upon the appearance of pulse M at point $b$, the output end of divider 64, gate 65 is opened and the pulses at point $a$ are applied to and counted by counter 67. Gate 65 remains open until pulse S appears at point $c$, the output end of source 69. In this manner, the total number of pulses recorded by counter 67 corresponds to the unit time interval T.

Pulse S is also applied to generator 63 to trigger generator 63 and produce a second series of pulses at point $e$, the output end of generator 63. In addition, pulse S is applied to the opening control terminal of gate 70. Accordingly, the pulses from generator 63 pass through gate 70 and appear at point $g$, the input end of fraction counter 68. Gate 70 remains open until coincidence occurs between a pulse at point *a* and a pulse at point *e*. At coincidence, a pulse appears at point *f*, the output end of circuit 66, and is applied to the closing control terminal of gate 70 to close gate 70. As in the circuits of Figs. 1 and 4, the time intervals between the pulses of generator 62 and the pulses of generator 63 are related in accordance with the relationship $$\frac{n-1}{n}$$

Accordingly, the total number of pulses appearing at point *g* and recorded by counter 68 correspond to the fractional time interval *t*. The total time interval $\Delta t$ is then the sum of the unit time interval T and the fractional time interval *t*.

Although the invention has been described in particular as applying to pulses, it is clear that the invention may be applied generally to measuring the interval between any pair of spaced signals. Furthermore, instead of pulse generators, generators of any other type of periodic signals may be used with equal success, according to the present invention. Although no particular reference has been made to the form of counter employed in any of the embodiments of the present invention, it should be clear that any conventional counter, of either the analog type or the digital type, may successfully be employed to indicate the final result.

It is thus seen that the present invention provides a method and apparatus for rapidly and accurately measuring the time interval between a pair of spaced signals. By providing means for interpolating for the fractional count, the accuracy of the result is greatly increased without sacrificing the speed of obtaining the result, and without increasing the precision requirements over those of conventional digital time measuring systems.

What is claimed as new is:

1. Apparatus for measuring the time interval between a first and second pulse, said apparatus comprising a first source of uniformly spaced pulses, means responsive to the first pulse for actuating said first source, means coupled to said first source for counting the number of pulses generated by said first source, means responsive to the second pulse for deactuating said counting means whereby said counting means presents a count of the number of pulses generated by said first source during the time interval to be measured, a second source of uniformly spaced pulses, the time separation between the pulses from said second source being related to the time separation between the pulses from said first source in accordance with the relationship $$\frac{n-1}{n}$$

where *n* is an integer, means responsive to the second pulse for actuating said second source, means coupled to said second source for counting the number of pulses generated by said second source, and means responsive to coincidence between the pulses from said first and second sources for deactuating the last-named counting means whereby said last-named counting means presents a count of the number of pulses generated by said second source during the interval between the second pulse and said coincidence.

2. Apparatus for measuring the time interval between a first and second signal, said apparatus comprising a first source of periodic signals, means responsive to the first signal for actuating said first source, means coupled to said first source and deactuable by the second signal for counting the number of signals generated by said first source during the time interval to be measured, a second source of periodic signals, means responsive to the second signal for actuating said second source, the frequencies of the signals from said first and second sources being related in accordance with the relationship $$\frac{n}{n-1}$$

where *n* is an integer, and means responsive to coincidence between the signals from said first and second sources and coupled to said second source for counting the number of signals generated by said second source during the time interval between the second signal and said coincidence to present a count indicative of the fractional time interval between the second signal and the immediately preceding signal from said first source.

3. Apparatus for measuring the time interval between a first and second pulse, said apparatus comprising a first source actuable for producing a first train of uniformly spaced pulses, means responsive to the first pulse for actuating said first source, means coupled to said first source for counting the number of pulses generated by said first source during the time interval to be measured to present a unit count of the time interval, a second source actuable for producing a second train of uniformly spaced pulses, means responsive to the second pulse for actuating said second source, the time separations between the pulses from said first and second sources being related in accordance with the relationship $$\frac{n-1}{n}$$

where *n* is an integer, and means coupled to said second source and responsive to coincidence between the pulses from said first and second sources for counting the number of pulses generated by said second source during the interval between the second pulse and said coincidence to present a fractional count of the time interval between the second pulse and the last pulse from said first source counted by the first-named counting means.

4. In a system for measuring the time interval between a first pulse and a second pulse and of the type in which a unit counter counts the number of unit pulses generated by a pulse generator during the time interval to be measured, a device for counting the number of fractional time intervals remaining whenever the time interval to be measured is unequal to a multiple of the time interval between the unit pulses, said device comprising a source of pulses, said source of pulses generating pulses in response to the occurrence of the second pulse, the time interval between the pulses from said source differing from the time interval between the unit pulses, means coupled to said source for counting the number of pulses generated thereby, and means responsive to coincidence between a pulse from said source and one of the unit pulses for deactuating said counting means.

5. A device according to claim 4 wherein the time interval between the pulses from said source and the time interval between the unit pulses are related in accordance with the relationship $$\frac{n-1}{n}$$

where *n* is an integer.

6. The method of measuring the time interval between a first pulse and a second pulse, said method comprising the steps of generating a first series of uniformly spaced pulses bearing a predetermined time relationship to the time of arrival of the first pulse, the time interval between two successive pulses of said uniformly spaced pulses being greater than the time interval between said first and second pulses, generating a second series of uniformly spaced pulses bearing a predetermined time relationship to the time of arrival of the second pulse, the spacings between the pulses of said first series and the pulses of said second series being related in accordance with the relationship $$\frac{n-1}{n}$$

where $n$ is an integer, and counting the number of pulses of said second series occurring during the time interval between the second pulse and coincidence between the pulses of said first and second series.

7. The method defined in claim 6, wherein the initial pulses of said first and second series coincide in time with the first and second pulses, respectively.

8. A system comprising a first means for generating signal pulses at one rate, a second means for generating signal pulses at a rate different from the rate of said first means, means responsive to coincident signal pulses for producing an output signal, means responsive to an input signal for causing pulses of said first and second means to appear at said responsive means thereby causing an output signal at an interval from said input signal determined by the position of said input signal with respect to the pulse of said first means immediately preceding said input signal.

9. A system for determining the position of a signal between two pulses of continuously generated fixed frequency pulses comprising means for generating pulses at a rate different from the rate of the first-mentioned pulses, means responsive to coincident pulses for producing an output signal, means responsive to said first-mentioned signal for causing said first-mentioned pulses and said second-mentioned pulses to appear at said responsive means, and thereby causing an output signal at an interval from said first-mentioned signal determined by the position of said first-mentioned signal between said two pulses.

10. A system for determining the position of a signal between two pulses of continuously generated fixed frequency pulses comprising means for generating pulses at a rate greater than the rate of said first-mentioned pulses, means responsive to coincident pulses for producing an output signal, means responsive to said first-mentioned signal for causing said first-mentioned pulses and said second-mentioned pulses to appear at said responsive means, and thereby causing an output signal at an interval from said first-mentioned signal proportional to the interval between said first-mentioned signal and the first occurring pulse of said two pulses.

11. A system for determining the position of a signal between two pulses of continuously generated fixed frequency pulses comprising means for generating pulses at a rate different from the rate of said first-mentioned pulses, means responsive to coincident pulses for producing an output signal, means responsive to said first-mentioned signal for causing said first-mentioned pulses and said second-mentioned pulses to appear at said responsive means, and means responsive to said first-mentioned signal and said output signal for counting the pulses occurring at one of said rates during the interval between said first-mentioned signal and said output signal.

12. A system comprising a first means for generating signal pulses at one rate, a second means for generating signal pulses at a rate different from the rate of said first means, said difference being such that a difference of one pulse exists in a selected time interval, means responsive to coincident signal pulses for producing an output signal, means responsive to an input signal for causing pulses of said first and second means to appear at said responsive means thereby causing an output signal at an interval from said input signal determined by the position of said input signal with respect to the pulse of said first means immediately preceding said input signal.

References Cited in the file of this patent

UNITED STATES PATENTS

| 2,504,852 | Lewis | Dec. 18, 1950 |
| 2,560,124 | Mofenson | July 10, 1951 |

OTHER REFERENCES

Miller: Abst. 715,443, December 11, 1946.